United States Patent
Best et al.

(10) Patent No.: US 8,521,790 B2
(45) Date of Patent: *Aug. 27, 2013

(54) INCREASING EFFICIENCY OF DATA STORAGE IN A FILE SYSTEM

(75) Inventors: Steven F. Best, Westford, MA (US); Michael R. Cooper, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 411 days.

This patent is subject to a terminal disclaimer.

(21) Appl. No.: 12/612,457

(22) Filed: Nov. 4, 2009

(65) Prior Publication Data
US 2010/0049755 A1 Feb. 25, 2010

Related U.S. Application Data

(62) Division of application No. 10/697,899, filed on Oct. 30, 2003, now Pat. No. 7,647,355.

(51) Int. Cl.
*G06F 17/30* (2006.01)

(52) U.S. Cl.
USPC .......................................................... 707/822

(58) Field of Classification Search
USPC ............... 707/609, 687, 821, 822; 714/4.4
See application file for complete search history.

(56) References Cited

U.S. PATENT DOCUMENTS

| | | | |
|---|---|---|---|
| 5,828,876 A | 10/1998 | Fish et al. | |
| 5,909,540 A * | 6/1999 | Carter et al. | 714/4.4 |
| 5,963,962 A | 10/1999 | Hitz et al. | |
| 6,125,435 A * | 9/2000 | Estakhri et al. | 711/201 |
| 6,459,986 B1 | 10/2002 | Boyce et al. | |
| 6,564,271 B2 | 5/2003 | Micalizzi, Jr. et al. | |
| 6,571,261 B1 | 5/2003 | Wang-Knop et al. | |
| 6,615,224 B1 | 9/2003 | Davis | |
| 6,628,935 B1 | 9/2003 | Lawrence | |
| 6,661,454 B1 | 12/2003 | Hwang et al. | |
| 6,697,846 B1 | 2/2004 | Soltis | |
| 6,721,764 B2 | 4/2004 | Hitz et al. | |
| 6,832,236 B1 | 12/2004 | Hamilton, II et al. | |
| 6,912,676 B1 | 6/2005 | Gusler et al. | |
| 6,978,283 B1 | 12/2005 | Edwards et al. | |
| 7,010,554 B2 | 3/2006 | Jiang et al. | |
| 7,072,910 B2 | 7/2006 | Kahn et al. | |
| 7,080,206 B2 | 7/2006 | Berks et al. | |
| 7,085,785 B2 | 8/2006 | Sawdon et al. | |
| 7,085,888 B2 | 8/2006 | Loafman | |
| 7,111,014 B2 | 9/2006 | Sawdon et al. | |

(Continued)

OTHER PUBLICATIONS

USPTO Non-final office action dated Apr. 27, 2006 regarding U.S. Appl. No. 10/697,899.

(Continued)

*Primary Examiner* — Albert Phillips, III
(74) *Attorney, Agent, or Firm* — Yee & Associates, P.C.; David A. Mims, Jr.

(57) ABSTRACT

A method, apparatus, and computer instructions for storing data in a file system. A determination is made as to whether space is available in an inode of the file in the file system. The data is stored into the inode in response to space being available. Additionally, data for a file may be stored in a block that is partially filled with data from another file. Data for a file may be stored using either the inode or by sharing a block. Data also may be stored using both of these mechanisms.

18 Claims, 4 Drawing Sheets

(56) References Cited

U.S. PATENT DOCUMENTS

| | | |
|---|---|---|
| 7,290,013 B2 | 10/2007 | Doucette et al. |
| 7,555,504 B2 | 6/2009 | Bixby et al. |
| 7,647,355 B2 | 1/2010 | Best et al. |
| 2002/0091670 A1* | 7/2002 | Hitz et al. ............... 707/1 |
| 2003/0076893 A1* | 4/2003 | Bruekers et al. ......... 375/295 |
| 2003/0182317 A1 | 9/2003 | Kahn et al. |
| 2003/0191745 A1 | 10/2003 | Jiang et al. |
| 2004/0123039 A1 | 6/2004 | Berks et al. |
| 2004/0139273 A1 | 7/2004 | Doucette et al. |
| 2004/0254907 A1 | 12/2004 | Crow et al. |
| 2005/0050110 A1 | 3/2005 | Sawdon et al. |
| 2005/0065986 A1* | 3/2005 | Bixby et al. ............. 707/204 |
| 2005/0080996 A1 | 4/2005 | Loafman |
| 2005/0234867 A1 | 10/2005 | Shinkai |

OTHER PUBLICATIONS

USPTO Response to Non-final office action dated Apr. 27, 2006 regarding U.S. Appl. No. 10/697,899.

USPTO Final office action dated Oct. 18, 2006 regarding U.S. Appl. No. 10/697,899.

USPTO Appeal Brief dated Mar. 19, 2007 regarding U.S. Appl. No. 10/697,899.

USPTO Non-final office action dated Jul. 16, 2007 regarding U.S. Appl. No. 10/697,899.

USPTO Response to Non-final office action dated Oct. 16, 2007 regarding U.S. Appl. No. 10/697,899.

USPTO Non-final office action dated Dec. 27, 2007 regarding U.S. Appl. No. 10/697,899.

USPTO Response to Non-final office action dated Mar. 27, 2008 regarding U.S. Appl. No. 10/697,899.

USPTO Non-final office action dated Jul. 8, 2008 regarding U.S. Appl. No. 10/697,899.

USPTO Response to Non-final office action dated Oct. 1, 2008 regarding U.S. Appl. No. 10/697,899.

USPTO Non-final office action dated Apr. 16, 2009 regarding U.S. Appl. No. 10/697,899.

USPTO Response to Non-final office action dated Jul. 16, 2009 regarding U.S. Appl. No. 10/697,899.

USPTO Notice of allowance dated Aug. 25, 2009 regarding U.S. Appl. No. 10/697,899.

* cited by examiner

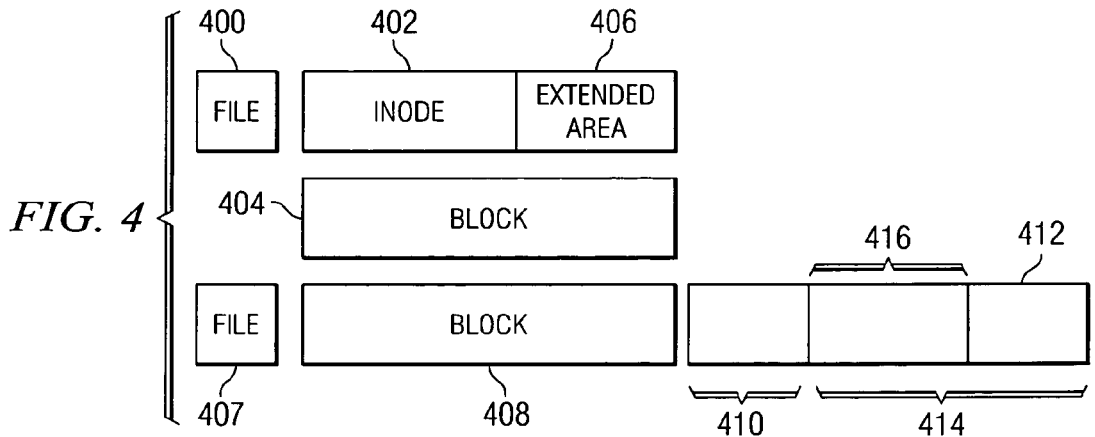

FIG. 4

```
       dinode {
               /*
                *       I. base area (128 bytes)
                *       ------------------------
                *
                *       define generic/POSIX attributes
                */
       inostamp;   /* 4: stamp to show inode belongs to fileset */
       fileset;    /* 4: fileset number */
       number;     /* 4: inode number, aka file serial number */
       gen;        /* 4: indode generation number */ ixpxd;          /* 8: inode extent descriptor */ size;           /* 8: size */
  502  nblocks;   /* 8: number of blocks allocated */ nlink;          /* 4: number of links to the object */ uid;            /* 4: user id of owner */
       gid;            /* 4: group id of owner */ mode;           /* 4: attribute, format and permission */ atime;     /* 8: time last data accessed */
       ctime;     /* 8: time last status changed */
       mtime;     /* 8: time last data modified */
       otime;     /* 8: time created */ di_acl;         /* 16: acl descriptor */ di_ea;          /* 16: ea descriptor */
  504  next_index; /* 4: Next available dir_table index */
```

FIG. 5A

```
alctype;        /* 4:  Type of ACL */
     /*
      *      Extension Areas.
      *
      *      Historically, the inode was partitioned into 4 128-byte areas,
      *      the last 3 being defined as unions which could have mult
      *      uses. The first 96 bytes had been completely unused unt
      *      an index table was added to the directory. It is now mo
      *      useful to describe the last 3/4 of the inode as a single
      *      union.
      */
     union {
          struct {
               /*
                * This table contains the information needed to
                * find a directory entry from a 32-bit index.
                * If the index is small enough, the table is in
                * otherwise, an x-tree root overlays this table
                */
               dir_table_slot_table[12] ;        /* 96: inline */

_dtroot;                          /* 288: dtree root */
          } _dir;                                /* (384) */ struct {
               union {
                    data [96] ;                  /* 96: unused */
                    struct {
                         *_imap;                 /* 4: unused */
                         _gengen ;               /* 4: generator */
                    } _imap;
               } _u1;                            /* 96: */
               union {
                    _xtroot[288] ;
                    struct {
                         unused[16] ;            /* 16: */
                         _dxd;                   /* 16: */
                         union {
                              dev;               /* 4: */
                              _fastsymlink [128] ;
                         } _u;
                         _inlineea[128] ;
                         _inlinedata[128] ;
                                          \
                    } _special;           508
               } _u2;
          } _file;
     } u;
};
```
⎫
⎬ 506
⎭

FIG. 5B

INCREASING EFFICIENCY OF DATA STORAGE IN A FILE SYSTEM

This application is a divisional of application Ser. No. 10/697,899, filed Oct. 30, 2003, now U.S. Pat. No. 7,647,355 issued Jan. 12, 2010.

BACKGROUND OF THE INVENTION

1. Technical Field

The present invention relates generally to an improved data processing system and in particular to a method and apparatus for storing data. Still more particularly, the present invention relates to a method, apparatus, and computer instructions for storing data in a file system.

2. Description of Related Art

Data is stored in a data processing system using a file system. The file system is a mechanism used to store and retrieve files on a storage device, such as a disc. The file system defines the directory structure for keeping track of files and the path's syntax required to access those files.

Further, a file system also defines the way that files are named as well as the maximum size of a file or volume. Examples of file systems are a journal file system (JFS) and NT file system (NTFS). File systems may divide a hard disc into small units called blocks. A block is the smallest unit of storage that may be allocated. Each block in a file system is either in an allocated state or a free state. The block size may differ depending on the particular implementation. Block sizes may be, for example, 512 bytes, 1024 bytes, 2048 bytes, 4096 bytes, or even in some cases 64K bytes. Most modern file systems support these types of block sizes. The selection of the block size is performed at the time in which the partition for an operating system is formatted.

As machine architectures, such as processor architectures, grow beyond 32 bytes or 64 bytes, the block size that may be supported by a file system increases. For example, with a 32 byte architecture in an Intel processor from Intel Corporation, handling of input/output is efficient using 4K pages. A 64 byte architecture is efficient with 4K and greater size pages. When file systems increase block sizes, which are supported, disc space may be wasted by the storage of files that are not divisible by the block size.

The present invention recognizes that file systems with many small files result in a large amount of wasted disc space. For example, with a block size of 512 bytes, storing a 1 byte file will result in 511 bytes being wasted. In another example, a file having a size of 513 bytes would result in one block being filled with data, while a second block only contains 1 byte of total data. As a result, 511 bytes of space are wasted. As the block size grows and the number of small files grows, the amount of disc space wasted increases.

Therefore, it would be advantageous to have an improved method, apparatus, and computer instructions for managing the storage of data in file systems.

SUMMARY OF THE INVENTION

The present invention provides a method, apparatus, and computer instructions for storing data in a file system. A determination is made as to whether space is available in an inode of the file in the file system. The data is stored into the inode in response to space being available. Additionally, data for a file may be stored in a block that is partially filled with data from another file. Data for a file may be stored using either the inode or by sharing a block. Data also may be stored using both of these mechanisms.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating the storage of data in components in a file system in accordance with a preferred embodiment of the present invention;

FIGS. 5A and 5B are a diagram illustrating a data structure for an inode in accordance with a preferred embodiment of the present invention;

DETAILED DESCRIPTION OF THE PREFERRED EMBODIMENT

Figure 1:
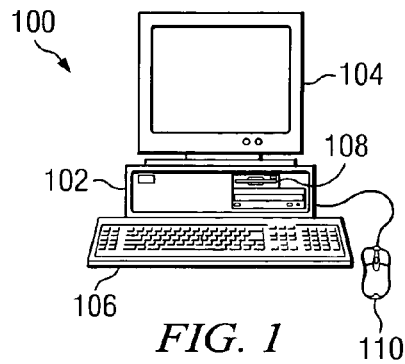
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
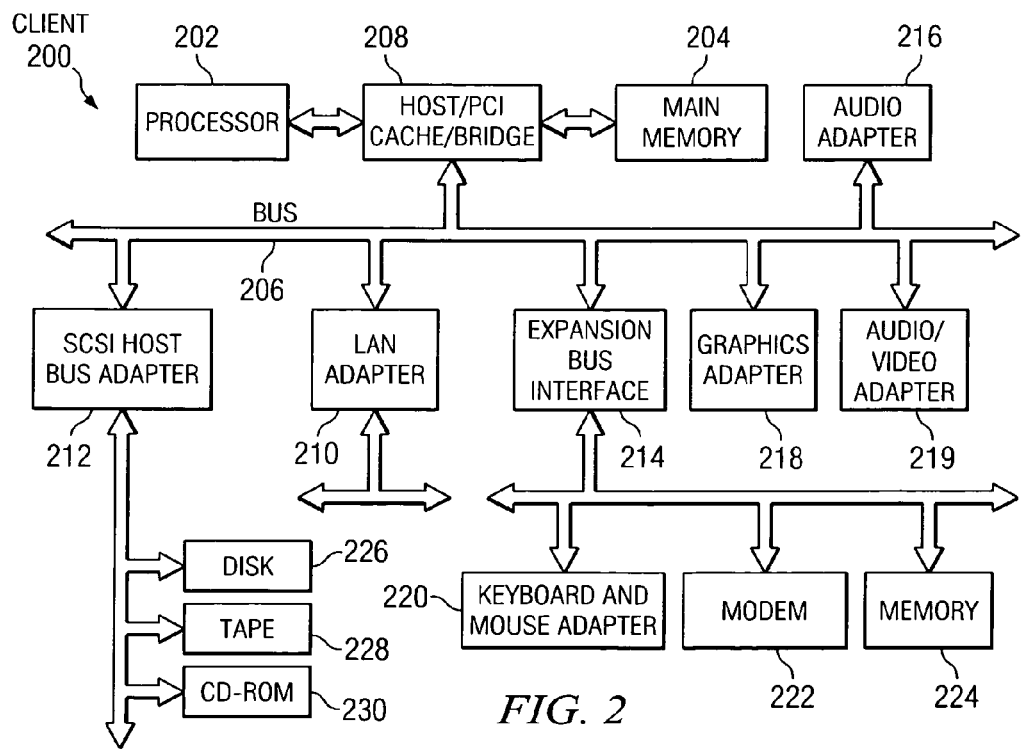
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disc drive 226, tape drive 228, and CD-ROM drive 230.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disc drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disc drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disc drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides an improved method, apparatus, and computer instructions for storing data in a file system. The mechanism of the present invention solves the problem of wasted space and blocks by inlining data directly with an inode associated with the file and/or by sharing bytes left in the last block of a file between different files. An inode is a data structure or record used to store information about files. This information includes, for example, a unique number that the file system uses to identify each file, the owner and group associated with the file, the file type, a permission list, a modification time of the inode, file creation, access, and modification times, the size of the file, disc address or physical location of the file on the disc.

By inlining data, data for a file is placed directly into the inode for the file. The inode of each file system may be variable in length, for example, with JFS, the inode is 512K bytes. A reserved space of 128 bytes for inlining metadata is present currently. This reserved space also is referred to as an extension area. The metadata in this area includes, for example, extended attributes and symbolic links. The mechanism of the present invention recognizes that this metadata could include the use of the actual data from the file.

Thereafter, if inlining data does not completely solve wasted space issues, unused space in a block for another file may be shared with the data from the current file. JFS, like most file systems, stores everything in fixed disc blocks. JFS allocates as many blocks for each file as needed to store the data. The last block in a file is typically only partially filed with that space being wasted.

The present invention recognizes that a file system with many small files results in a large amount of wasted disc space. As a result, the mechanism of the present invention allows for file block sharing. File block sharing makes use of unused space in the last block of each file by sharing each free group of bytes left in the block between files. In this manner, fewer blocks will include wasted or empty space, resulting in better file performance and better disc usage.

Figure 3:
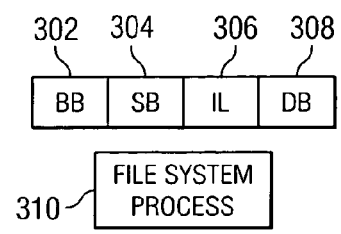
FIG. 3 is a diagram illustrating a file system in accordance with a preferred embodiment of the present invention.

Turning now to FIG. 3, a diagram illustrating a file system is depicted in accordance with a preferred embodiment of the present invention. In this example, file system 300 includes boot block (BB) 302, super block (SB) 304, inode list (IL) 306, and data blocks (DB) 308. File system process 310 includes the processes used to read and manipulate data within file system 300.

Boot block 302 is used when the data processing system is first booted. In particular, this block contains the code to boot strap the operating system. Super block 304 contains information about the entire disc. Inode list 306 is a list of inodes, and data block 308 contains the actual data in the form of directories and files. Super block 304 contains information used to keep track of the entire file system. This information includes, for example, the size of the file system, the number of free blocks on the file system, a list of free blocks, an index to the next free block on the list, the size of the inode list, the number of freeing inodes, a list of free inodes, an index to the next free inode on the list, lock fields for free block lists and free inodes list. This type of file system is one typically used in a Unix data processing system.

The mechanism of the present invention modifies this file system to store data within the inodes in inode list 306, as well as share space within data block 308 between different files. Each inode or entry within inode list 306 contains information, such as, the owner, the type of data block, the last modified time, the last accessed time, the last inode modified time, access permissions, the number of links to the file, the size of the file, and the data blocks associated with the file. The type of inode may be a file, directory, a character device, or a block device. A value of zero in these examples indicates that the particular inode is free.

In the illustrated example, file system process 310 may store data for an inode in inode list 306 in a portion of the inode that is typically used to store metadata, such as extended attributes and symbolic links to describe the data being stored. The mechanism of the present invention uses this field to store actual data rather than metadata. Of course, other fields in an inode may be used to store data for a file, depending on the implementation.

As a result, file system process 310 is able to inline user data directly into the inode. As used herein, inlining data means to place or insert data into a space or field in an inode or file system record. This type of data storage is used in the illustrative examples in the case in which the data for a file does not completely fill a block and is small enough to fit within this reserved area.

If this amount of space is insufficient, file system process 310 may use file block sharing to make use of unused space of a data block in data block 308 for the current file. In other words, data from the current file being stored or modified is stored in unused space in a shared data block of another file.

Turning now to FIG. 4, a diagram illustrating the storage of data in components in a file system is depicted in accordance with a preferred embodiment of the present invention. In this example, file 400 represents data that is to be stored in a file system, such as file system 300 in FIG. 3. Inode 402 is assigned to file 400 for use in identifying the data blocks in which data for file 400 is to be stored. In this example, data for file 400 is stored in data block 404. In the illustrative example, data block 404 is insufficient in size to store all of the data for file 400. As a result, any additional data for this file may be stored in extended area 406 of inode 402. If the space available in extended area 406 is insufficient to store the remaining data file 400, file block sharing may be employed to store additional data in another block allocated for another file.

In this illustrative example, file 407 has its data stored in block 408 and in section 410 of block of 412. As shown, block 412 is used as a shared block. The data from file 407 fills up all of block 408, but occupies only section 410 in block 412. As a result, section 414 of block 412 is unused. Normally, this unused space in block 412 is wasted. Through file block sharing, data for file 400 may be stored within section 414. In this particular example, only portion 414 of data block 412 is needed to store the remaining data from file 400. Any additional unused space in data block 412 may be shared among other files. In this manner, wasted disc space for files is eliminated for those files that are not divisible by the block size used in the file system.

With respect to information stored in the inode, a portion of the field is used to identify whether user data is inlined into the inode. Further, pointers may be included in the inode in which the pointers point to a shared block. Also, an offset may be used to identify the beginning of the data in the shared block along with a length that is used to identify the amount of data in the shared block.

Turning now to FIGS. 5A and 5B, a diagram illustrating a data structure for an inode is depicted in accordance with a preferred embodiment of the present invention. Inode 500 is an example of an inode in a file system, such as inode 402 in FIG. 4. In this example, inode 500 contains base area 502, index table 504, and extended area 506. Extended area 506 is employed to inline different file system objects. Two of these objects are symbolic links and extended attributes.

A symbolic link is a type of file that contains a path name to another file. The file type entry in the file's inode indicates that the entry is a symbolic link. When an attempt is made to access a symbolic link with a text editor or other program, the operating system kernel redirects the program to the file indicated by the symbolic link's path name. An extended attribute contains a name and value. Applications may attach additional information to a file object in the form of an extended attribute. A file object may have more than one extended attribute. Extended attributes associated with the file object are not a part of the file object's data. These attributes are maintained separately and managed by the file system that manages the object.

The mechanism of the present invention adds an additional object shown in line 508 to inline user data. This portion of inode 500 may be used to store data for a file assigned to inode 500.

Figure 6:
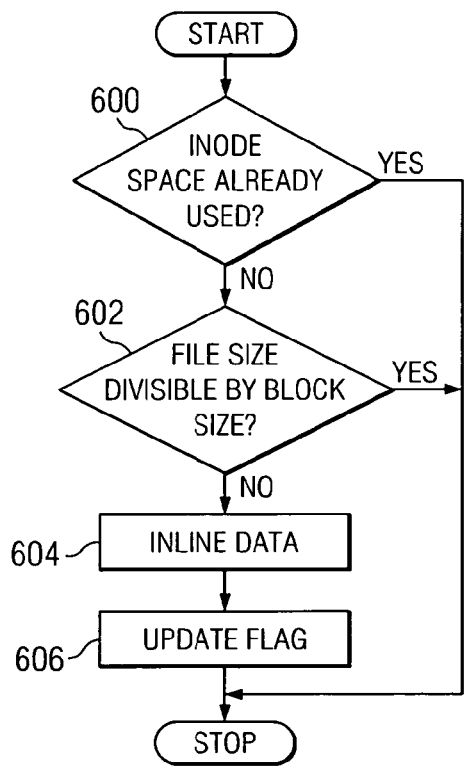
FIG. 6 is a flowchart of a process for inlining user data into an inode in accordance with a preferred embodiment of the present invention.

Turning now to FIG. 6, a flowchart of a process for inlining user data into an inode is depicted in accordance with a preferred embodiment of the present invention. The process illustrated in FIG. 6 may be implemented in a file system process, such as file system process 310 in FIG. 3.

The process begins by determining whether the inode space for the file is already used (step 600). This space is the extended area portion of the inode. This area may be used by other information, such as a symbolic link or extended attributes. If the inode space is not already used, then a determination is made as to whether the file size is divisible by the block size (step 602).

If the file size is not divisible by the block size, then the data is inlined into the inode (step 604). Thereafter, a flag is updated to show that user data has been inlined (step 606) with the process terminating thereafter. In the inode, the mode field in the inode is used to determine if user data is inlined into the inode.

With reference again to step 602, if the file size is divisible by the block size, data is not inlined because blocks will not be wasted when storing user data. With reference again to step 600, if the inode space is already used, the process also terminates because no space is present for storing user data.

Figure 7:
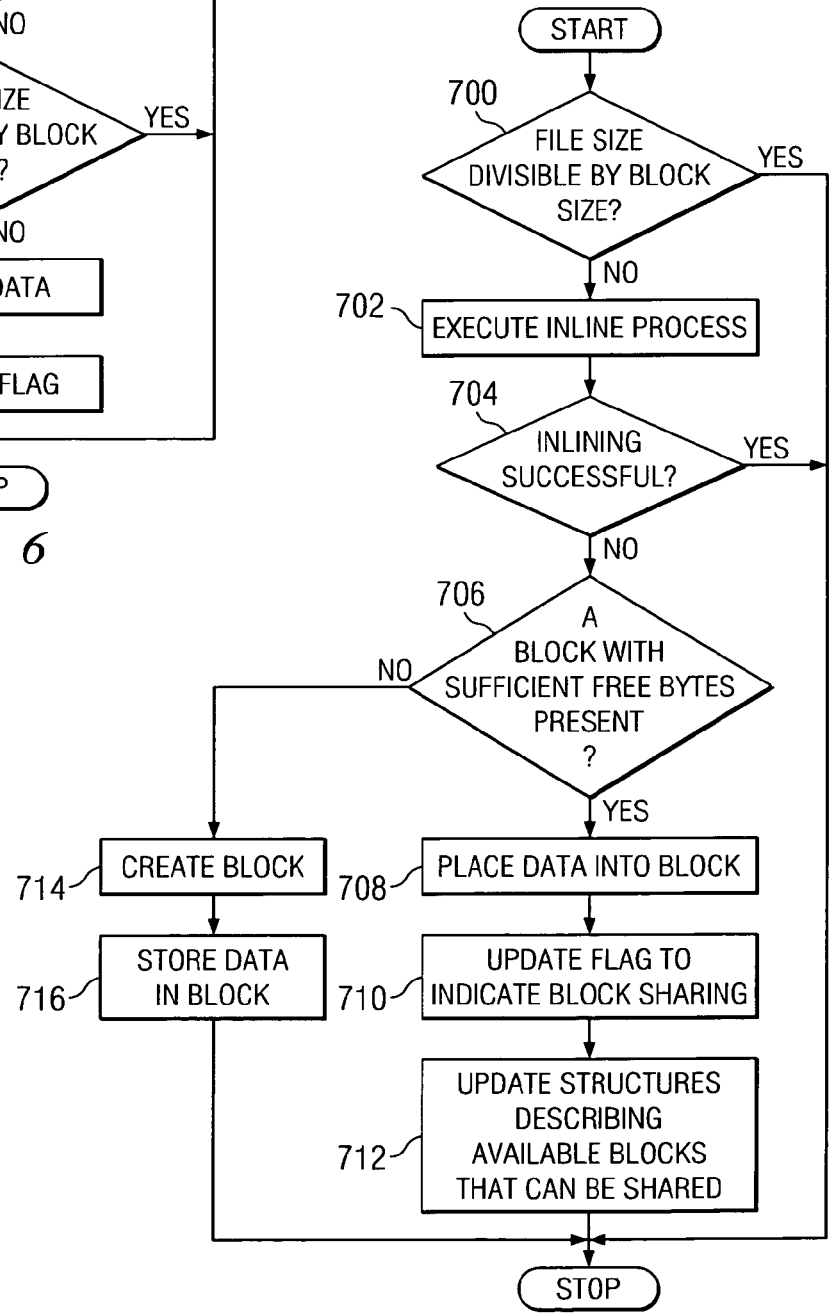
FIG. 7 is a flowchart of a process for sharing blocks between files in accordance with a preferred embodiment of the present invention.

Turning next to FIG. 7, a flowchart of a process for sharing blocks between files is depicted in accordance with a preferred embodiment of the present invention. The process illustrated in FIG. 7 may be implemented in a file system process, such as file system process 310 in FIG. 3.

The process begins by determining whether the file size is divisible by the block size (step 700). If the file size is not divisible by the block size, an inline process is executed (step 702). Step 702 may be performed using the process illustrated in FIG. 6 above. A determination is then made as to whether inlining of data was successful (step 704).

If all of the data was inlined in step 704, the process terminates. Otherwise, the data that is not inlined is placed in a shared block. A determination is made as to whether a block with sufficient free bytes to store the data is present (step 706). If such a block is found, the data is placed into the identified block (step 708).

Thereafter, a flag is updated to indicate block sharing (step 710). In the inode, the mode field in the inode is used to determine if the last bytes of the user data is in a shared block.

Further, data structures describing available blocks that can be shared are updated (step 712) with the process terminating thereafter. These data structures contain information describing available blocks that may be shared by reducing the number of bytes free. A list of free shared blocks is kept so the file system can find a shared block that contains enough free bytes to place the user data in. Once the block is full it is taken off the list of free shared blocks. The free shared blocks structure has the following information: block number, free bytes in the block, and pointer to the next block.

With reference again to step 706, if a block with sufficient free bytes is absent, then a block is created or allocated (step 714), and the data is stored in the created block (step 716) with the process terminating thereafter.

With reference again to step 704, if inlining is successful in storing all of the data in step 704, the process terminates. The process also terminates if the file size is divisible by the block size because blocks will not be wasted by performing this process.

Thus, the present invention provides an improved method, apparatus, and computer instructions for storing data in a file system. The mechanism of the present invention may store data within an inode. Further, the mechanism of the present invention also allows for the sharing of blocks between different files. In this manner, disc space utilization is improved because of the reduction of blocks with unused space.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disc, a hard disc drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, the method comprising:
   receiving a command to store a file in a file system having an inode, wherein the inode is usable to store metadata associated with the file;
   responsive to the file having a size that is greater than a block size of blocks in the file system, storing a plurality of data of the file only in an integer number of blocks, wherein a first remainder data of the file remains after storing, and wherein the first remainder data is less than the block size;
   determining whether space is available in the inode; and
   responsive to space being available in the inode, placing the first remainder data directly into the inode.

2. The method of claim 1 further comprising:
   determining whether a second remainder data of the file is present after the first remainder data is placed into the inode; and
   responsive to the second remainder data being present, storing the second remainder data in a partially filled block associated with another file, wherein the partially filled block also stores data of the another file.

3. The method of claim 2 further comprising:
   responsive to the partially used block becoming full from storing the second remainder data in the partially used block, removing the partially used block from a list of free shared blocks, wherein, for each free shared block on the list of free shared blocks, the list of free shared blocks contains a block number, a free byte quantity, and a pointer to a next free shared block.

4. The method of claim 3, wherein the partially filled block is a last block associated with the another file.

5. The method of claim 1, wherein the data is placed into an extension area of the inode.

6. The method of claim 1 further comprising:
   indicating that data is stored in the inode.

7. The method of claim 1 further comprising:
   determining whether placing the data in the inode was successful.

8. The method of claim 6 wherein indicating is performed by updating a flag.

9. The method of claim 2 further comprising:
   using pointers to point to the partially filled block, wherein the pointers are included in the inode.

10. A recordable-type computer readable medium a computer program product encoded thereon executable in a data processing system, the computer program product comprising:
    instructions for receiving a command to store a file in a file system having an inode, wherein the inode is usable to store metadata associated with the file;
    instructions for responsive to the file having a size that is greater than a block size of blocks in the file system, storing a plurality of data of the file only in an integer number of blocks, wherein a first remainder data of the file remains after storing, and wherein the first remainder data is less than the block size;
    instructions for determining whether space is available in the inode; and
    instructions for, responsive to space being available in the inode, placing the first remainder data directly into the inode.

11. The recordable-type computer readable medium of claim 10, the computer program product further comprising:
    instructions for determining whether a second remainder data of the file is present after the first remainder data is placed into the inode; and
    instructions, responsive to the second remainder data being present, for storing the second remainder data in a partially filled block associated with another file, wherein the partially filled block also stores data of the another file.

12. The recordable-type computer readable medium of claim 11, the computer program product further comprising:
    instructions, responsive to the partially used block becoming full from storing the second remainder data in the partially used block, for removing the partially used block from a list of free shared blocks, wherein, for each free shared block on the list of free shared blocks, the list of free shared blocks contains a block number, a free byte quantity, and a pointer to a next free shared block.

13. The recordable-type computer readable medium of claim 12, wherein the partially filled block is a last block associated with the another file.

14. The recordable-type computer readable medium of claim 10, wherein the data is placed into an extension area of the inode.

15. The recordable-type computer readable medium of claim 10, the computer program product further comprising:
   instructions for indicating that data is stored in the inode.

16. The recordable-type computer readable medium of claim 10, the computer program product further comprising:
   instructions for determining whether placing the data in the inode was successful.

17. The recordable-type computer readable medium of claim 15, wherein indicating is performed by updating a flag.

18. The recordable-type computer readable medium of claim 11, the computer program product further comprising:
   instructions for using pointers to point to the partially filled block, wherein the pointers are included in the inode.

\* \* \* \* \*